United States Patent [19]
Ransom

[11] 3,763,401
[45] Oct. 2, 1973

[54] WIRING DUCT AND TERMINAL SYSTEM

[76] Inventor: David L. Ransom, 882 Hester Rd., Memphis, Tenn.

[22] Filed: Aug. 7, 1972

[21] Appl. No.: 278,379

[52] U.S. Cl............... 317/122, 174/72 A, 174/101, 317/118, 339/198 R
[51] Int. Cl................................................ H02g 3/04
[58] Field of Search............... 174/44, 59, 60, 68 C, 174/72 R, 72 A, 101; 179/98; 317/118, 122; 339/198 R, 198 J

[56] References Cited
UNITED STATES PATENTS

| 413,429 | 10/1889 | Baker................................ 174/60 X |
| 507,424 | 10/1893 | Ford et al. ............................ 179/98 |
| 3,002,177 | 9/1961 | Bundy.............................. 174/59 X |
| 3,485,937 | 12/1969 | Caveney ............................. 174/101 |

FOREIGN PATENTS OR APPLICATIONS

| 1,045,430 | 6/1953 | France............................. 174/68 C |

Primary Examiner—Laramie E. Askin
Attorney—John R. Walker, III

[57] ABSTRACT

An electrical wiring system including a duct for carrying a group of wires. The duct includes provisions for passing wires outwardly through the wall thereof at numerous locations along the length thereof. Additionally, a plurality of terminals are attached to one of the walls of the duct for receiving and terminating internally of the duct certain ones of the group of wires, and providing structure externally of the duct for subsequently receiving one of the respective ends of additional wires to electrically extend certain ones of the group of wires to various remote locations. Several embodiments of the duct and the terminals are disclosed. However, all of the terminals pass through the wall of the duct and include particular structure for attachment thereof to the duct.

11 Claims, 21 Drawing Figures

Patented Oct. 2, 1973
3,763,401
2 Sheets-Sheet 1
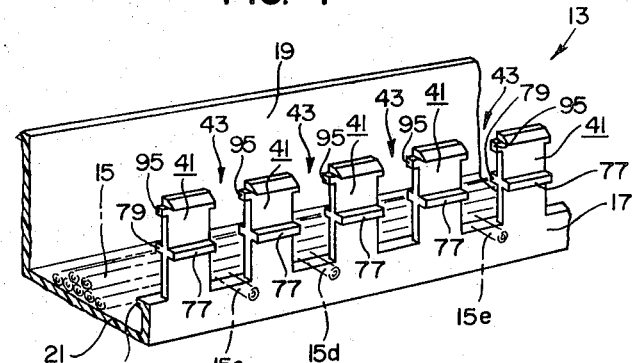
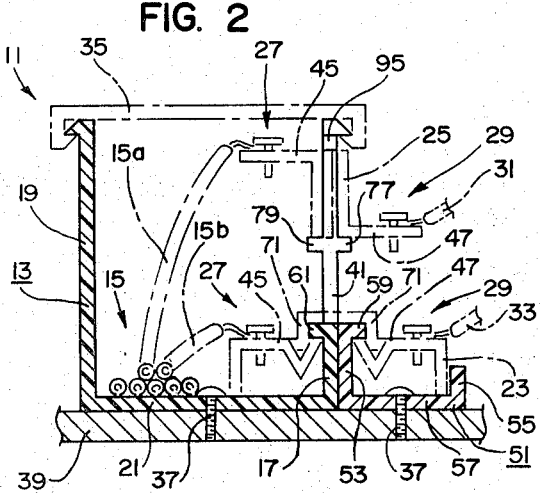
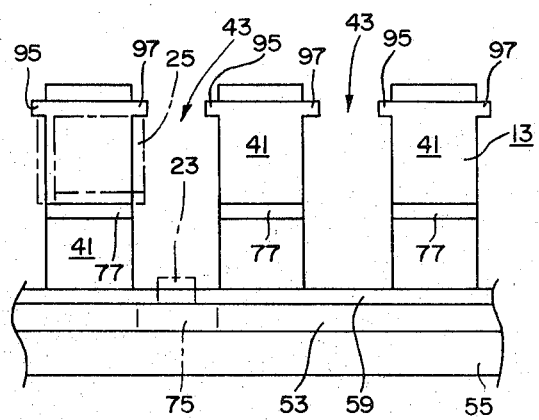
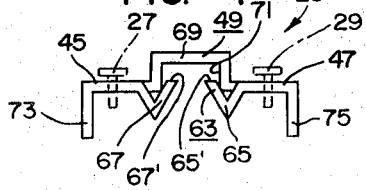
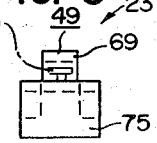
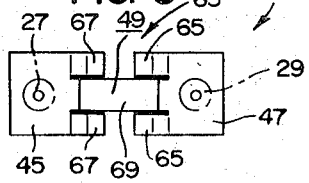
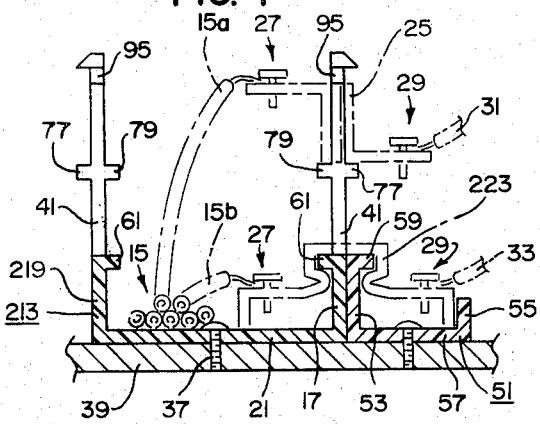
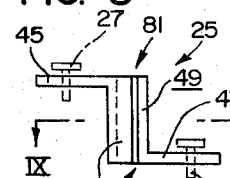
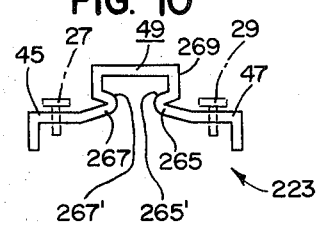
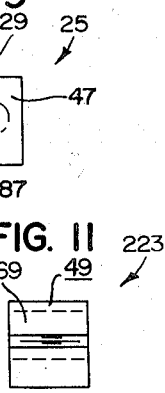

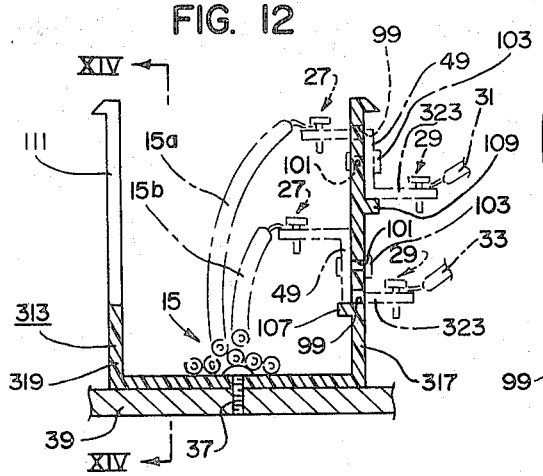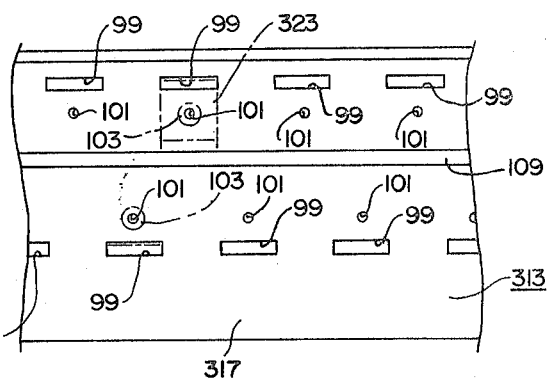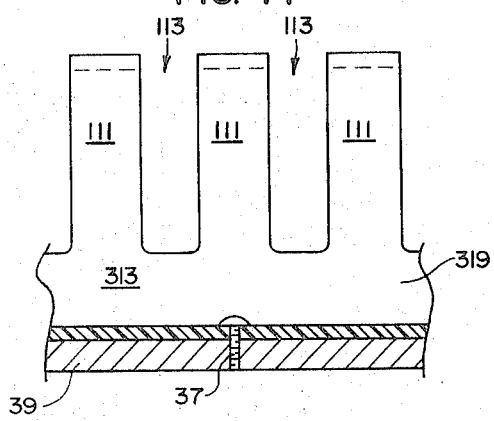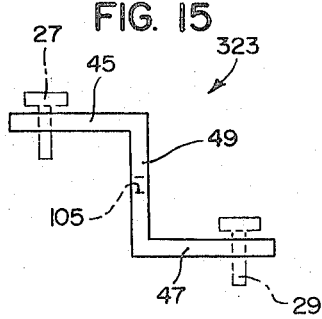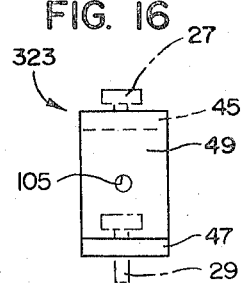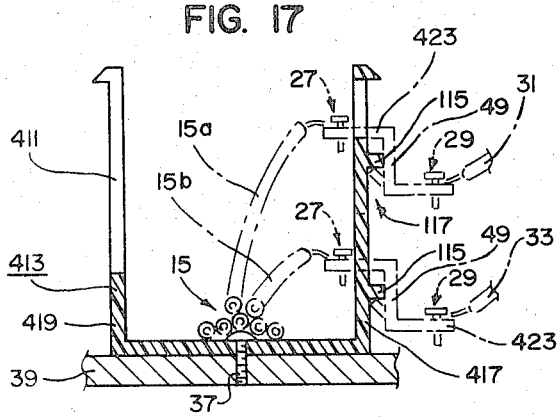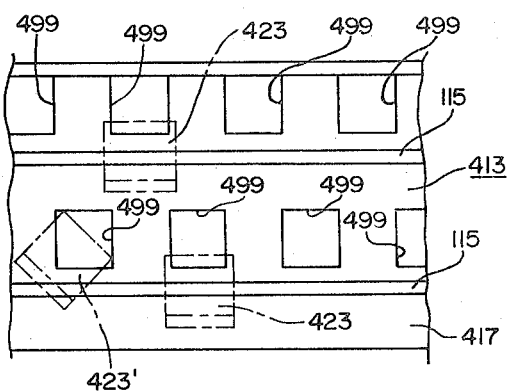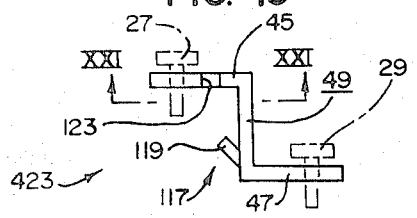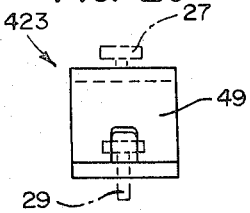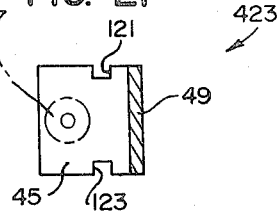

WIRING DUCT AND TERMINAL SYSTEM

BACKGROUND OF THE INVENTION

1. Field of the Invention

This invention pertains to wiring ducts and is particularly directed towards wiring ducts which incorporate terminals.

2. Description of the Prior Art

A preliminary patentability search revealed the following U. S. patents: Richardson U.S. Pat. No. 1,639,310; Peterson U.S. Pat. No. 3,027,418; Schwing U.S. Pat. No. 3,441,806; and Ludvik U.S. Pat. No. 3,536,961. None of the above patents show or suggest applicant's device.

A well known standard procedure involves carrying wires in duct structure and feeding them outwardly from the duct to a terminal block. This procedure is taught in the above-mentioned '310 patent. However, it should be noted that the wires do not terminate in the duct of the '310 patent but are led outwardly therefrom to the external terminal block.

Coupled with the increase of demand for highly sophisticated hardware requiring cabinetlike panels for housing and interconnecting various electrical components is the problem of providing suitable space for the various components within the panel. Complex panels usually are wired to the extent possible by the original equipment manufacturer who provides terminal blocks for completing the installation in the field. These field connections are accomplished after the equipment is installed. In other words, in the case of an elevator control system, the panels would have the limit switches and relays, etc., pre-wired by the original equipment manufacturer and rather than simply coil up long lengths of wire which are intended to go to various floors in the hoistway, these wires are terminated at terminal blocks. The field connections involve extending the long lengths of wire in the hoistway and connecting one of the ends thereof to the terminal blocks in a manner obvious to those skilled in the art.

SUMMARY OF THE INVENTION

The present invention is directed towards providing more space in the distribution panels by eliminating the terminal blocks and some of the ducts. Additionally, the present invention provides a more efficient manner for marking the terminal connections than heretofore. The electric wiring system of the present invention includes a duct for carrying a group of wires. The duct includes provisions for passing wires outwardly through the walls thereof at numerous locations along the length thereof. Additionally, a plurality of terminals are attached to one of the walls of the duct for receiving and terminating internally of the duct certain ones of the group of wires and for providing structure externally of the duct for subsequently receiving one of the respective ends of additional wires to electrically extend certain ones of the group of wires to the various remote locations. Several embodiments of the duct and the terminals are herein disclosed. However, all of the terminals pass through the walls of the duct and include particular structure for attachment thereof to the duct.

BRIEF DESCRIPTION OF THE DRAWINGS

FIG. 1 is a perspective view showing one embodiment of the wiring duct of the present invention carrying a group of wires.

FIG. 2 is a sectional view of the duct as depicted in FIG. 1 shown suitably attached to support structure adjacent an elongated ancillary channel of the present invention.

FIG. 3 is a side elevational view of the structure depicted in FIG. 2.

FIG. 4 is a side elevational view of one of the embodiments of the terminal of the present invention.

FIG. 5 is an end view of the terminal depicted in FIG. 4.

FIG. 6 is a top view of the terminal depicted in FIG. 4.

FIG. 7 is a view somewhat similar to FIG. 2, showing an alternate embodiment of the lower terminal and the duct.

FIG. 8 is a side elevational view of another embodiment of the terminal of the present invention.

FIG. 9 is a sectional view taken as on the line IX—IX of FIG. 8.

FIG. 10 is a side elevational view of the lower terminal depicted in FIG. 7.

FIG. 11 is an end view of the terminal depicted in FIG. 10.

FIG. 12 is a sectional view of another embodiment of the duct of the present invention shown carrying a group of wires and having terminals attached thereto.

FIG. 13 is a side elevational view of the structure depicted in FIG. 12.

FIG. 14 is a sectional view taken as on the line XIV—XIV of FIG. 12.

FIG. 15 is a side elevational view of one of the terminals depicted in FIG. 12.

FIG. 16 is an end elevational view of the terminal depicted in FIG. 15.

FIG. 17 is a view somewhat similar to FIG. 12 showing another embodiment of the terminal and duct of the present invention.

FIG. 18 is a side elevational view of the structure depicted in FIG. 17.

FIG. 19 is a side elevational view of the terminal as depicted in FIG. 17.

FIG. 20 is an end view of the terminal depicted in FIG. 19.

FIG. 21 is a sectional view taken as on the line XXI—XXI of FIG. 19.

DESCRIPTION OF THE PREFERRED EMBODIMENT

The wiring duct and terminal system 11 of the present invention is depicted in FIG. 2 of the drawings and includes a channel-like duct 13 for carrying a group of wires 15. The duct 13 is formed from any well known electrical insulating substance such as vinyl plastic and includes a pair of confrontingly arranged vertical walls 17, 19 integrally joined by a horizontal web 21 extending along the lengths thereof. The system 11 also includes a plurality of terminals 23 as clearly shown in FIGS. 4 – 6 of the drawings and/or terminals 25, as clearly shown in FIGS. 8 and 9 of the drawings. The terminals 23, 25 are attached to one of the vertical walls, as the wall 17. The terminals 23, 25 include means 27 for receiving and terminating internally of the duct 13 certain ones of the group of wires, such as the wires 15a, 15b. The terminals 23, 25, being formed from an electrical conductive substance, such as brass, extend through the wall 17 and include means 29 for subsequently receiving selectively one of the respective ends of additional wires, such as the wires 31, 33 to electrically extend certain ones of the group of wires 15, such as the wires 15a, 15b. The system 11 also includes a removable cover 35 for closing the duct 13. Additionally, attachment means such as a plurality of screws 37 are included for attaching the duct 13 to supporting structure such as a panel 39.

From FIGS. 1 – 3 of the drawings, it may be seen that at least one of the vertical walls, such as the wall 17, includes a plurality of upstanding fingerlike members 41 defining a plurality of slots 43 for selectively passing wires therethrough, e. g., the wires 15c, 15d, 15e, as shown in FIG. 1 of the drawings.

The terminals 23, 25 respectively include proximal and distal horizontally disposed flange portions 45, 47 joined by midportions 49. The flange portions 45, 47 respectively include the means 27, 29 for receiving one of the ends of certain wires, as previously disclosed. In this regard, the means 27, 29 are conveniently depicted in the drawings as screws received in threaded apertures. However, the means 27, 29 are intended to include other well known structure, e. g., solder connections and/or solderless connections, such as blade and sheath structure.

From FIGS. 2, 3 and 7 of the drawings, it may be seen that the system 11 includes at least one elongated ancillary channel 51 for cooperating with the duct 13 to electrically isolate portions of the terminals 23 from adjacent duct support structure, e. g., the metal panel 39.

The ancillatry channel 51 includes first and second confrontingly arranged vertical walls 53, 55 joined by a horizontal web 57 extending along the lengths thereof. From FIGS. 2 and 7 of the drawings, it may be seen that the walls 53, 55 are considerably lower in height than either of the vertical walls 17, 19 of the duct 13. Additionally, the first wall 53 terminates upwardly thereof with an inwardly directed shelflike protrusion 59 extending along the length thereof. Further, at least one of the walls, e. g., the wall 17 shown in FIG. 2, includes an inwardly directed shelflike protrusion 61 extending along the length thereof. More specifically, the protrusion 61 is positioned subjacent the slots 43 at a height on the duct 13 which corresponds to the height of the first wall 53. Further, the webs 21, 57 are positioned in a single plane with the first wall 53 contiguously engaging one of the vertical walls, such as the wall 17, with the inwardly directed protrusion 59 being remotely positioned with respect to the inwardly directed protrusion 61 for reasons yet to be disclosed. Attachment means, such as the screws 37, are included for attaching the channel 51 to support structure such as the panel 39.

From FIG. 3 of the drawings, it may be seen that the terminal 23 passes through the slot 43 and the midportion 49 of the terminal 23 includes attachment means 63 for grippingly engaging the protrusions 59, 61. More specifically, the attachment means 63 includes frontingly arranged springlike clips 65, 67 which respectively engage the inwardly directed protrusions 59, 61. The clips 65, 67 yieldably allow downward movement of the terminal 23 from the protrusions 59, 61 during the installation of the terminal 23 and preclude upward movement to remove the terminal 23 subsequent to the installation thereof. The clips 65, 67 are joined by a horizontally disposed ridge 69 that passes through the slot 43 with a corresponding portion thereof as at 71 conforming to and engaging certain portions of the protrusions 59, 61, as clearly shown in FIGS. 2 and 4 of the drawings. The clip 23 preferably includes proximal and distal leg portions 73, 75 which restingly engage the respective webs 21, 57.

Particular attention is now directed towards FIGS. 1, 2, 3, 8 and 9 of the drawings, wherein it may be seen that each of the fingerlike members 41 includes at least one protuberance such as the outwardly directed protuberance 77. It should be understood that the respective fingerlike members 41 may alternately include an inwardly directed protuberance, such as the protuberance 79 or may include both inwardly and outwardly directed protruberances 77, 79, as shown in FIG. 1.

The terminal 25 (FIGS. 8, 9) is restingly supported by the protuberances 77, 79 with the protuberances 77, 79 being positioned substantially intermediate the length of the fingerlike members 41 as best viewed in FIG. 1 of the drawings. The terminal 25 passes through the appropriate slot 43 with the proximal flange portion 45 thereof disposed within the duct 13 and the distal flange portion 47 thereof disposed externally of the duct 13 as best shown in FIG. 2 of the drawings. The midportion 49 of the terminal 25 includes attachment means 81. The attachment means 81 includes boxlike means 83 having at least three vertical sides 85, 87, 89 thereof joined one to the other, as best viewed in FIG. 9 of the drawings, i. e., with two sides, such as sides 87, 89 thereof defining a mouthlike opening 91. The interior of the boxlike means 83 substantially conforms to the cross sectional shape of the fingerlike member 41. The mouthlike opening 91 receives the fingerlike member 41, allowing lateral movement of the terminal 25 during the installation thereof wherein the boxlike means 83 circumferentially engages the fingerlike member 41.

The boxlike means 83 preferably includes a fourth side 93 which partially closes the mouthlike opening 91. The boxlike means 83 preferably is resilient to yieldably allow lateral movement of the terminal 5 during the installation thereof with the fourth side 93 ultimately engaging the fingerlike member 41, thus precluding lateral movement to remove the terminal 25 subsequent to the installation thereof. It should be understood that the fourth side 93 may be considerably shorter in height than the sides 85, 87, 89 or constitute a catch which engages the fingerlike member 41 to preclude lateral movement subsequent to the installation thereof.

The fingerlike members 41 preferably include a pair of remotely arranged laterally extending nibs 95, 97 positioned adjacent the free end thereof with opposite sides such as the sides 85, 93 of the boxlike means 83 respectively engaging the nibs 95, 97 which preclude upward movement of the terminal 25 away from the protuberances 77, 79.

From the above disclosure, it can now be readily appreciated that the means 27, 29 for the lower terminals 23 are staggered from the means 27, 29 for the upper terminals 25, thus facilitating easy access to either one or the other for the purpose of attaching or disconnecting wires therefrom or the like.

Another embodiment of the duct is herein disclosed and is character referenced in FIG. 7 of the drawings by the numeral 213. The duct 213 differs from the duct 13 in that the wall 219 thereof is substantially identical to the wall 17 for the principal embodiment, i. e., rather than being solid as shown in FIGS. 1 and 2 of the drawings for the wall 19. More specifically, the wall 219 includes the finger 41 and the shelflike protrusion 61, as does the wall 17 thereof as previously disclosed for the prinipal embodiment.

An alternate embodiment of the lower terminal depicted in FIG. 2 of the drawings is herein disclosed and is character referenced in FIGS. 7, 10, and 11 by the numeral 223. The terminal 223 differs from the terminal 23 in that the bridge 269 thereof is substantially equal in width to the width of the slot 43 or wider than is the bridge 69. Further, the confrontingly arranged clips 265, 267 respectively include curved portions 265', 267' for engaging the bottom edges of the protrusions 59, 61 rather than the end portions 65', 67' shown in FIG. 4 of the drawings for the terminal 23. The portions 65', 67' for the terminal 23 accomplish the same purpose as do the portions 265', 267' of the terminal 223, i. e., yieldably allowing downward movement from the protrusions 59, 61 during the installation of the terminal means and precluding upward movement to remove the terminal means subsequent to the installation thereof.

Another embodiment of the duct means is disclosed herein and character referenced in FIGS. 12, 13 and 14 of the drawings by the numeral 313. One of the vertical walls, e. g., the wall 317, of the duct 313 provided with a plurality of first apertures 99. Further, another embodiment of the terminal means is disclosed herein and character referenced in FIGS. 12, 13, 15 and 16 of the drawings by the numeral 323. A plurality of the terminals 323 respectively pass through the first apertures 99. The terminals 323 include midportions 49 which respectively are vertically disposed as clearly shown in FIGS. 12 and 15 of the drawings.

The vertical wall 317 is provided with a plurality of second apertures 101 for respectively receiving attachment means such as a plurality of rivets 103. The midportions 49 of the terminals 323 are provided with apertures 105 which also receive the respective rivets 103 for securing the terminals 323 to the vertical wall 317.

Particular attention is now directed towards FIG. 12 of the drawings wherein it may be seen that the midportions 49 of the lowermost terminals 323 respectively contiguously engage the interior surface of the vertical wall 317 while the respective midportions 49 of the uppermost terminals 323 contiguously engage the exterior surface of the vertical wall 317. Additionally, I prefer that the wall 317 include an inwardly directed protrusion 107 for engaging and restingly supporting the lowermost terminals 323. Further, the wall 317 includes an outwardly directed protrusion 109 for engaging and restingly supporting the uppermost terminals 323.

From FIGS. 12 and 14 of the drawings, it may be seen that the wall 319 of the duct 313 is provided with a plurality of fingerlike members 111 defining a plurality of slots 113. The slots 113 are very similar to the slots 43 of the principal embodiment and accomplish the same purpose, i. e., allowing certain wires to be passed therethrough, as shown in FIG. 1 of the drawings for the wires 15c, 15d, 15e. It should be noted that each of the first apertures 99 has a size and shape substantially conforming to the cross section of either flange portion 45, 47 to facilitate receiving either flange 45, 47. From FIG. 13 of the drawings, it may be seen that the bottom row of apertures 99 is staggered with respect to the top row of apertures 99 to facilitate access to the means 27, 29 for the purpose of attaching and/or removing wires therefrom.

Another embodiment of the duct means is herein disclosed and is character referenced in FIGS. 17, 18 of the drawings by the numeral 413. One of the vertical walls such as the vertical wall 417 of the duct means 413 includes ledge means 115. Additionally, an alternate embodiment of the terminal means 23 is herein disclosed and is character referenced in FIGS. 17 - 21 of the drawings by the numeral 423.

The wall 417 is provided with a plurality of apertures 499 which are substantially square, as shown in FIG. 18 of the drawings. The apertures 499 are arranged in a top row and a bottom row with the apertures 499 in the bottom row being staggered with respect to the apertures 499 in the top row substantially as depicted and for the same purpose as just mentioned for the apertures 99. In this regard, it should be noted that the ledge means 115 extends along the length of the wall 417 projecting outwardly therefrom and subjacent the top row of apertures 499 and subjacent the bottom row of apertures 499 for engaging and supporting the terminal means 423 in a manner yet to be disclosed. THe terminal means 423 includes attachment means 117 comprising bias means 119 for engaging the edge 115 to yieldably allow downward movement of the terminal 423 during the installation thereof and preclude upward movement subsequent to the installation thereof. The proximal flange portion 45 of each of the terminals 423 is provided with a pair of remotely arranged notches 121, 123 which engage opposite sides of the wall 417 defining the apertures 499. In other words, the respective bottom side of each of the apertures 499 is substantially equal in length to the spaced apart distance between the notches 121, 123. Accordingly, the terminals 423 must be diagonally positioned to be received in the respective apertures 499, i. e., substantially as depicted in FIG. 18 for the terminal 423', until the notches 121, 123 are in a position to receive portions of the wall 417. Therefore, after the notches 121, 123 are suitably engaged with the opposite sides of the appropriate aperture 499, the terminal 423 can be moved vertically downward so as to engage the bias means 19 in the above-described manner. It should now be apparent that engaging the attachment means 117 as above-described rigidly holds the terminals 423 in a manner equally effective as the previously mentioned embodiments.

The wall 419 of the duct 413 preferably includes a plurality of fingerlike members 411, i. e., the fingerlike members 411 being substantially identical to the above-described fingerlike members 111. In other words, the fingerlike members 411 define slots (not shown) substantially identical to the above-described slots 113 for passing wires therethrough.

It should beunderstood that the peculiar features of each of the embodiments of the duct means just described may be intermingled in various combinations without departing from the spirit and scope of the present invention, e. g., a certain duct of the present invention may have both of the vertically disposed walls thereof solid or like the vertical walls 317 and/or 417, etc.

Although the invention has been described and illustrated with respect to preferred embodiments thereof, it is to be understood that it is not to be so limited since changes and modifications may be made therein which are within the full intended scope of the invention.

I claim:

1. An electrical wiring system comprising channel-like duct means for carrying a group of wires, said duct means being formed from an electrical insulating substance and having a pair of confrontingly arranged vertical walls integrally joined by a horizontal web extending along the lengths thereof, at least one of said vertical walls including a plurality of upstanding fingerlike members defining a plurality of slots for selectively passing wires therethrough, a plurality of terminal means attached to one of said vertical walls, said terminal means including means for receiving and terminating internally of said duct means certain ones of the group of wires and means externally of said duct means and subsequently receiving selectively one of the respective ends of additional wires to electrically extend certain ones of the group of wires, said terminal means being formed from an electrical conductive substance and extending through said one vertical wall, said terminal means respectively including proximal and distal horizontally disposed flange portions joined by midportions, said flange portions respectively including said means for receiving one of the ends of certain wires, attachment means for attaching said terminal means to said duct means, and at least one elongated ancillary channel means for cooperating with said duct means to electrically isolate portions of said plurality of terminal means from adjacent duct support structure, said ancillary channel means including first and second confrontingly arranged vertical walls joined by a horizontal web extending along the lengths thereof, the first of said walls of said ancillary channel means being considerably lower in height than either of said vertical walls of said duct means, said first wall of said ancillary channel means terminating upwardly thereof with an inwardly directed shelflike protrusion extending along the length thereof, at least one of said vertical walls of said duct means including an inwardly directed shelflike protrusion extending along the length thereof, said protrusion of said duct means being positioned subjacent said slots and being at a height thereon which corresponds to the height of said first vertical wall of said ancillary channel means, said webs of said duct and channel means being in a single plane with said first wall of said ancillary channel means contiguously engaging one of said vertical walls of said duct means, said inwardly directed protrusion of said ancillary channel means being remotely positioned with respect to said inwardly directed protrusions of said duct means, said terminal means respectively passing through certain of said slots of said duct means, said midportions of said terminal means including said attachment means which grippingly engages said protrusions of said duct and ancillary channel means, and said proximal portions of said terminal means being disposed within said duct means and said distal portions thereof being disposed within said ancillary channel means.

2. The system of claim 1 in which said attachment means that engages said protrusions of said duct and ancillary channel means includes confrontingly arranged springlike clips which respective engage said inwardly directed protrusions of said duct and ancillary channel means, said clips yieldably allowing downward movement thereof from said protrusions during the installation of said terminal means and precluding upward movement to remove said terminal means subsequent to the installation thereof, said clips respectively being joined by horizontally disposed bridges that pass through said slots of said duct means with corresponding portions thereof conforming to and engaging certain portions of said protrusions of said duct and ancillary channel means.

3. An electrical wiring system comprising channel-like duct means for carrying a group of wires, said duct means being formed from an electrical insulating substance and having a pair of confrontingly arranged vertical walls integrally joined by a horizontal web extending along the lengths thereof, at least one of said vertical walls including a plurality of upstanding fingerlike members defining a plurality of slots for selectively passing wires therethrough, at least one of said vertical walls including a plurality of first apertures, a plurality of terminal means attached to one of said vertical walls, said terminal means including means for receiving and terminating internally of said duct means certain ones of the group of wires and means externally of said duct means for subsequently receiving selectively one of the respective ends of additional wires to electrically extend certain ones of the group of wires, said terminal means being formed from an electrical conductive substance and extending through said first apertures in said one vertical wall, said terminal means respectively including proximal and distal horizontally disposed flange portions joined by vertically disposed midportions, said flange portions respectively including said means for receiving one of the ends of certain wires, and attachment means for attaching said terminal means to said duct means; said one vertical wall of said duct means including a plurality of second apertures, said midportions of said terminal means respectively being provided with apertures and said attachment means including a plurality of rivets, each of said terminal means being attached to said duct means by said rivets being received through said second apertures and said apertures in said midportions said terminal means.

4. An electrical wiring system comprising channel-like duct means for carrying a group of wires, said duct means being formed from an electrical insulating substance and having a pair of confrontingly arranged vertical walls integrally joined by a horizontal web extending along the lengths thereof, at least one of said vertical walls including a plurality of upstanding fingerlike members defining a plurality of slots for selectively passing wires therethrough, at least one of said vertical walls including a plurality of first apertures, a plurality of terminal means attached to one of said vertical walls, said terminal means including means for receiving and terminating internally of said duct means certain ones of the group of wires and means externally of said duct means subsequently receiving selectively one of the respective ends of additional wires to electrically extend certain ones of the group of wires, said terminal means being formed from an electrical conductive substance and extending through said first apertures in said one vertical wall, said terminal means respectively including proximal and distal horizontally disposed flange portions joined by vertically disposed midportions, said flange portions respectively including said means for receiving one of the ends of certain wires, and attachment means for attaching said terminal means to said duct means; at least one of said vertical walls of said duct means including ledge means for engaging and supporting said terminal means, said ledge means being disposed beneath said first apertures and projecting outwardly from said duct means, said attachment means includes bias means for engaging said ledge means to yieldably allow downward movement of said terminal means during the installation thereof and preclude upward movement subsequent to the installation thereof, said respective proximal flange portions of said terminal means passing through said first apertures, and each proximal flange portion thereof being provided with a pair of remotely arranged notches which engage portions of said one vertical wall of said duct means defining said first apertures.

5. An electrical wiring system comprising channel-like duct means for carrying a group of wires, said duct means being formed from an electrical insulating substance and having a pair of confrontingly arranged vertical walls integrally joined by a horizontal web extending along the lengths thereof, at least one of said vertical walls including a plurality of upstanding fingerlike members defining a plurality of slots for selectively passing wires therethrough, a pluralijy of terminal means attached to one of said vertical walls, said terminal means including means for receiving and terminating internally of said duct means certain ones of the group of wires and means externally of said duct means for subsequently receiving selectively one of the respective ends of additional wires to electrically extend certain ones of the group of wires, said terminal means being formed from an electrical conductive substance and extending through said one vertical wall, said terminal means including proximal and distal horizontally disposd flange portions joined by midportions, said flange portions respectively including means for receiving one of the ends of certain wires, and attachment means for attaching said terminal means to said duct means; each of said plurality of upstanding fingerlike members of said duct means including at least one protuberance, said terminal means respectively being restingly supported by said protuberances, said protuberances being positioned substantially intermediate the lengths of said fingerlike members, said terminal means respectively passing through certain of said slots with said proximal flange portions thereof being disposed within said duct means and said distal flange portions thereof being disposed externally of said duct means, said midportions of said terminal means respectively including said attachment means, said attachment means including boxlike means having at least three sides thereof joined one to the other with two sides thereof defining a mouthlike opening, the interior of said boxlike means substantially conforming to the respective cross sectional shape of fingerlike members, and said mouthlike openings respectively receiving said fingerlike members allowing lateral movement of said terminal means during the installation thereof wherein said boxlike means circumferentially engages said fingerlike members.

6. The system of claim 5 in which said protruberances of said respective fingerlike members are directed outwardly.

7. The system of claim 5 in which said protuberances of said respective fingerlike members are directed inwardly.

8. The system of claim 5 in which said boxlike means includes a fourth side partially closing said mouthlike opening, said boxlike means being resilient to yieldably allow lateral movement of said terminal means during the installation thereof and said fourth side engaging said fingerlike member precluding lateral movement to remove said terminal means subsequent to the installation thereof.

9. The system of claim 8 in which each of said plurality of fingerlike members includes a pair of remotely arranged laterally extending nibs positioned adjacent the free end thereof with opposite sides of the boxlike means respectively engaging said nibs which preclude upward movement of said terminal means away from said protuberances.

10. An electrical wiring system comprising channel-like duct means for carrying a group of wires, said duct means being formed from an electrical insulating substance and having a pair of confrontingly arranged vertical walls integrally joined by a horizontal web extending along the lengths thereof, a plurality of terminal means attached to one of said vertical walls, said terminal means including means for receiving and terminating internally of said duct means certain ones of the group of wires and means externally of said duct means for subsequently receiving selectively one of the respective ends of additional wires to electrically extend certain ones of the group of wires, said terminal means being formed from an electrical conductive substance and extending through said one vertical wall, said terminal means including proximal and distal horizontally disposed flange portions joined by vertically disposed midportions, said flange portions respectively including means for receiving one of the ends of certain wires, and attachment means for fixedly attaching said vertically arranged midportions of said terminal means to said duct means.

11. An electrical wiring system comprising channel-like duct means for carrying a group of wires, said duct means being formed from an electrical insulating substance and having a pair of confrontingly arranged vertical walls integrally joined by a horizontal web extending along the lengths thereof, a plurality of terminal means attached to one of said vertical walls, said terminal means including means for receiving and terminating internally of said duct means certain ones of the group of wires and means externally of said duct means for subsequently receiving selectively one of the respective ends of additional wires to electrically extend certain ones of the group of wires, said terminal means being formed from an electrical conductive substance and extending through said one vertical wall, at least one elongated ancillary channel means for cooperating with said duct means to isolate portions of said plurality of terminal means from adjacent duct support structure, said ancillary channel means including first and second confrontingly arranged vertical walls joined by a horizontal web extending along the lengths thereof, said webs of said duct and channel means being in a single plane with said first wall of said ancillary channel means contiguously engaging one of said vertical walls of said duct means, said terminal means being respectively positioned with one end thereof disposed within said duct means and with the other end thereof disposed within said ancillary channel means, and attachment means located on said terminal means for grippingly engging said first wall of said ancillary channel means and said one of said vertical walls of said duct means to fixedly attach said ancillary channel means to said duct means.

* * * * *